United States Patent [19]
Gregory

[11] Patent Number: 5,240,560
[45] Date of Patent: Aug. 31, 1993

[54] WASTEWATER EVAPORATOR SYSTEM

[76] Inventor: Marshall W. Gregory, 231 Old Spring La., Houston, Tex. 77015

[21] Appl. No.: 733,158

[22] Filed: Jul. 19, 1991

Related U.S. Application Data

[63] Continuation of Ser. No. 563,564, Aug. 6, 1990, abandoned.

[51] Int. Cl.$^5$ .......................... B01D 1/00; C02F 1/04
[52] U.S. Cl. .................................. 159/16.1; 159/25.1; 159/28.2; 159/33; 159/44; 202/175; 202/206; 202/242; 202/265; 203/1; 203/10; 203/49; 203/100; 203/DIG. 7; 203/DIG. 18
[58] Field of Search ............... 159/16.1, DIG. 40, 44, 159/28.2, 25.1, 33, 34; 202/238, 196, 206, 242, 175, 265; 203/1, 10, DIG. 7, DIG. 18, 49, 100

[56] References Cited

U.S. PATENT DOCUMENTS

| | | | |
|---|---|---|---|
| 2,364,360 | 12/1944 | Hickman | 202/234 |
| 3,565,767 | 2/1971 | Light | 159/16.1 |
| 3,860,492 | 1/1975 | Lowi, Jr. et al. | 203/10 |
| 4,060,118 | 11/1977 | Papafingos et al. | 159/9.2 |
| 4,090,916 | 5/1978 | Papafingos et al. | 159/9.2 |
| 4,276,124 | 6/1981 | Mock | 202/236 |
| 4,366,030 | 12/1982 | Anderson | 202/234 |
| 4,534,828 | 8/1985 | Erickson et al. | 159/16.1 |
| 4,606,794 | 8/1986 | Wyckoff | 202/234 |
| 4,613,409 | 9/1986 | Volland | 203/DIG. 1 |
| 4,790,904 | 12/1988 | Yates | 159/16.1 |
| 4,894,123 | 1/1990 | Helmich | 159/DIG. 32 |

Primary Examiner—Virginia Manoharan
Attorney, Agent, or Firm—James A. Bargfrede

[57] ABSTRACT

A wastewater evaporator system is provided for evaporating wastewater at a rate of about seven gallons per hour. Such system includes a heater, a blower, a plurality of honeycombed plates, a drive element including an electric motor, and a tank. Such system improves the environment and allows safe, reliable, and economical disposal of wastewater.

4 Claims, 6 Drawing Sheets

WASTEWATER EVAPORATOR SYSTEM

This is a continuation of U.S. patent application Ser. No. 07/563,564 filed Aug. 6, 1990, now abandoned.

BACKGROUND OF THE INVENTION

I. Field of the Invention

The present invention is directed to a system for evaporation of wastewater created, for example, in metal fabrication and metal processing.

II. Description of Related Art

U.S. Pat. No. 4,790,904 issued Dec. 13, 1988 to Yates is directed toward an evaporator for reducing water content of various chemical solutions. Yates does not disclose or suggest the system or the objectives obtained by the present invention.

SUMMARY OF THE INVENTION

The present invention is directed to a wastewater evaporator system in which housing means including a tank is provided for storing wastewater to be evaporated. A plurality of vanes or honeycombed plates are positioned in such tank and are rotated by drive means which include an electric motor. Heater means such as a heater blower provide heated air to the vanes as they rotate thereby causing evaporation of the wastewater picked up by the vanes from the wastewater in the tank. Control means including floats and electrical circuitry control the amount of wastewater brought into the tank and also shut down the system automatically when the wastewater level reaches a selected low level in the tank.

DESCRIPTION OF THE PREFERRED EMBODIMENT

Figure 1:
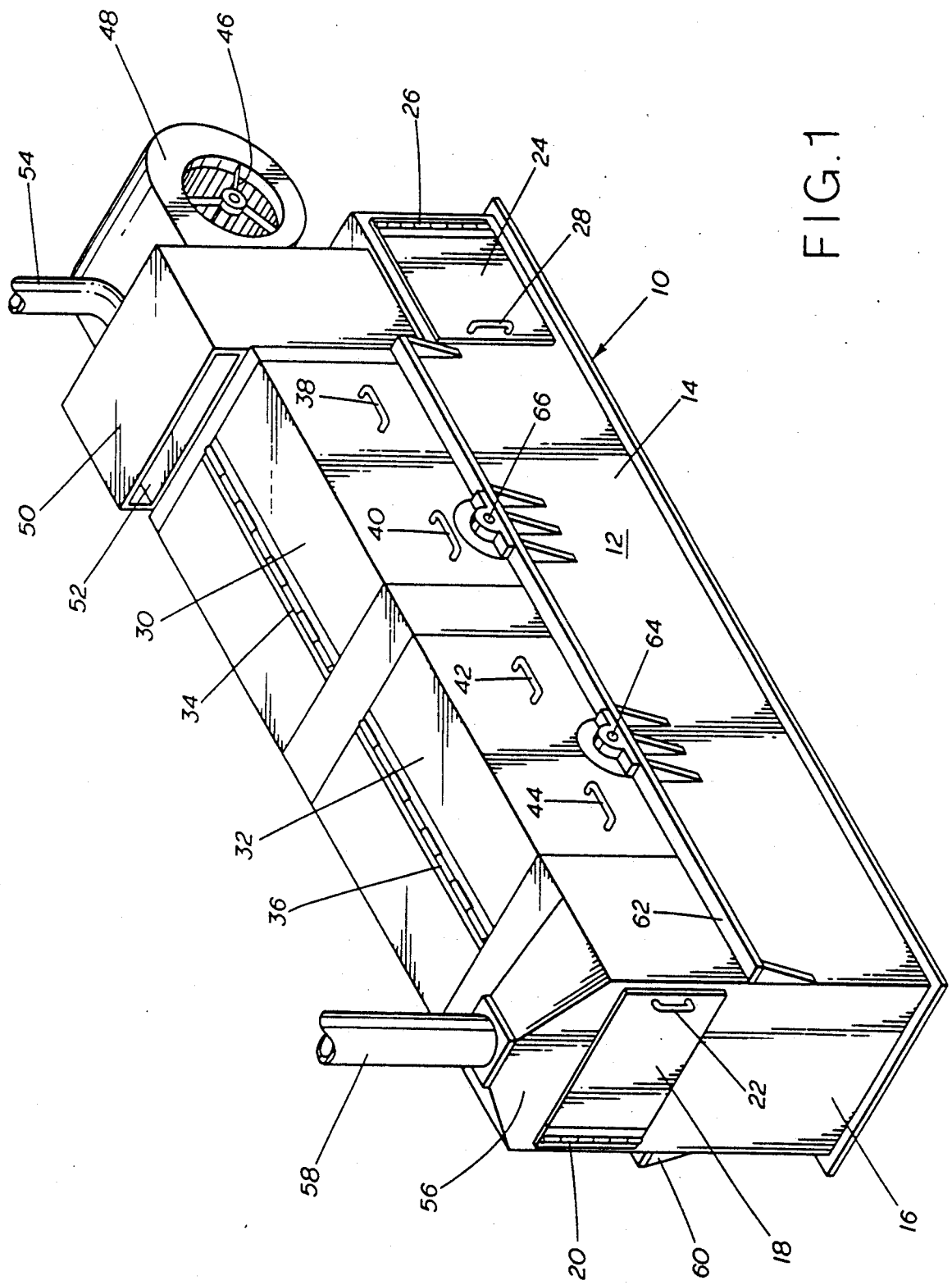
FIG. 1 is an upper, perspective view of the wastewater evaporator system of the present invention.

FIG. 1 is an upper, perspective view of the system of the present invention showing a floor 10. Housing 12 is positioned on floor 10 and may be of a rectangular configuration having side 14 and end 16 visible in FIG. 2. End door 18 is positioned in the upper portion of end 16 and may be fastened to end 16 with a hinge 20. At the opposite end of the end door 18 from hinge 20 is handle 22.

Side door 24 is positioned at one end of side 14 and is connected to side 14 with hinge 26. Handle 28 is positioned on side door 24 near the end opposite to hinge 26.

At the upper portion of housing 12 are doors 30 and 32 positioned respectively on hinges 34 and 36. Door 30 has handles 38 and 40 and door 32 has handles 42 and 44. Doors 30 and 32 allow access to the interior of the housing 12 as will be explained in detail subsequently.

At the end of housing 12 above side door 24 are blower means which include a squirrel cage 46 positioned in cover 48. Compartment 50 has an intake opening 52 and an exhaust pipe 54.

At the end of housing 12 having end door 18 is a compartment 56 having an exhaust pipe 58.

Positioned longitudinally along housing 12 is a support member 60 which is only partially visible in FIG. 1 and a support member 62. An axle 64 and an axle 66 are positioned on support members 60 and 62 and these axles support a plurality of fins which will be shown and described in detail subsequently.

It will be appreciated in viewing FIG. 1 that blower means are provided to circulate air in housing 12 to cause evaporation of wastewater in a tank in housing 12 in a manner to be explained in detail subsequently in connection with the drawings of the other figures.

Figure 2:
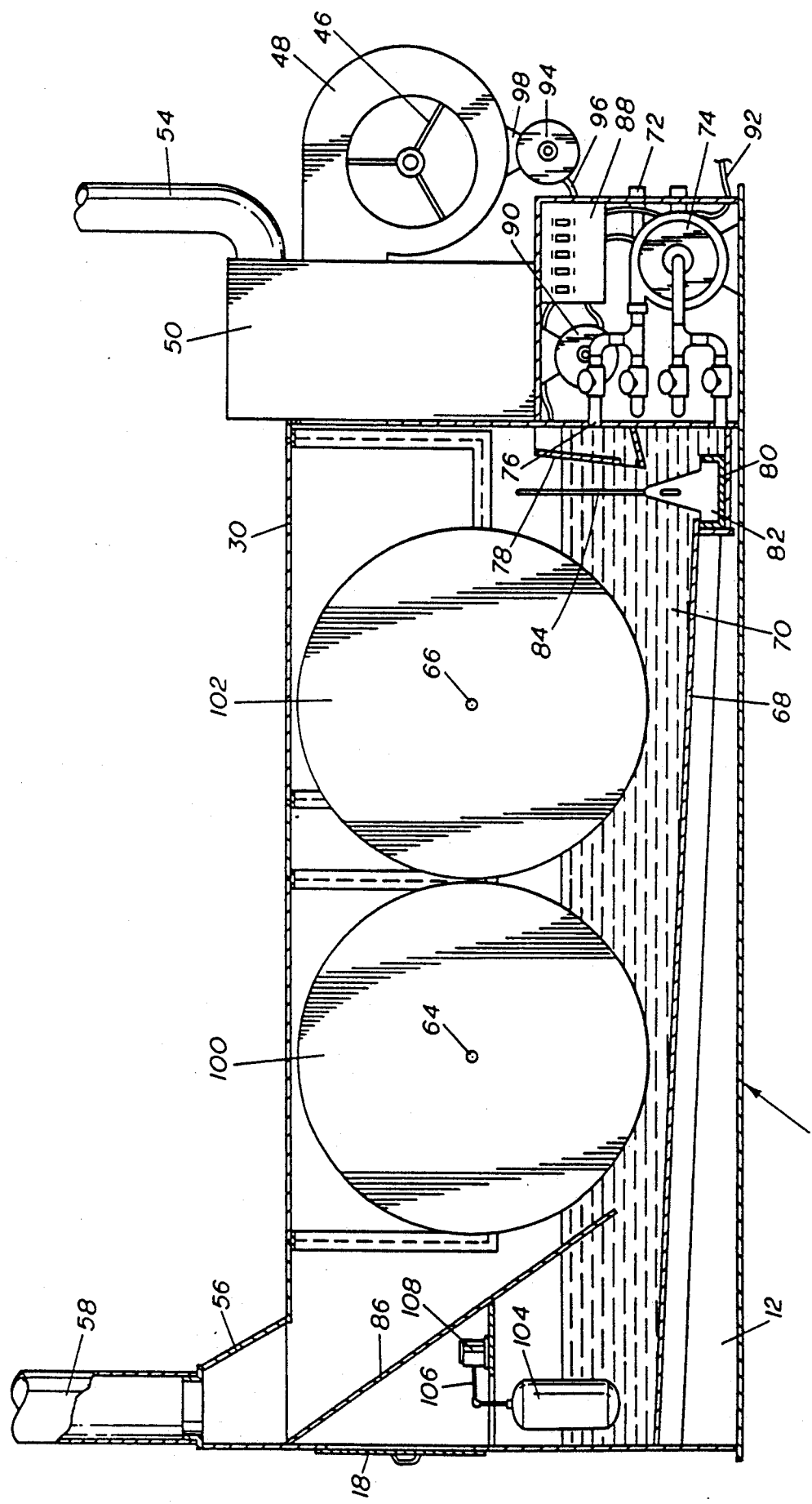
FIG. 2 is a partial sectional, elevational side view of the system shown in FIG. 1.

FIG. 2 is a partial sectional, elevational side view of the system shown in FIG. 1. Housing 12 positioned on floor 10. Tank 68 contains wastewater 70 from intake 72 and is pumped with pump 90 through a header and to the discharge 76. The wastewater from discharge 76 hits baffle 78 and solid material in the wastewater accumulates in pan 80 which contains bucket 82 having a handle 84. It will be appreciated that the solids from the wastewater which accumulate in the bucket 82 positioned in pan 80 may be removed through door 30 of the housing 12. An optional sludge removal pump 74 also may be used for removal of accumulated sludge in tank 68.

Baffle 86 near door 18 minimizes turbulence of the wastewater near the float arrangement which controls the level of wastewater in tank 68.

Electrical control panel 88 contains a plurality of switches to control electric power utilized in the system of the present invention. For example, the electrical control panel 88 has a switch which provides power to the electric motors utilized for the blower, an electrical switch for the motor to drive the axles on which the evaporator fins are positioned, and a switch for pump 74 and pump 90.

A source of electrical power 92 is fed to the electrical control panel 88 and the switches on control panel 88 are connected to the previously mentioned pumps and motors.

Motor 94 is connected to the electrical control panel 88 through lead 96 and drives belt 98 connected to squirrel cage 46 positioned in cover 48. The squirrel cage 46 acts as a blower for air which passes through a heater in compartment 50 and exhaust pipe 54 is connected to compartment 50 and vents to the atmosphere.

Axles 64 and 66 each have a plurality of blades are fins positioned on each axle such as fin 100 positioned on axle 64 and fin 102 positioned on axle 66. Wastewater 70 which has been pumped into tank 68 as explained previously is evaporated in accordance with the present invention through rotation of the plurality of fins on axles 64 and 66 as heated air passes over the upper portions of such plurality of fins. Wastewater is picked up by the lower portion of such plurality of fins and as rotation occurs, heated air passes over the upper portion of the fins and causes evaporation.

At the opposite end of evaporator tank 68 from the blower is a float arrangement to control the wastewater level in tank 68. Although two floats are utilized, only float 104 is visible in FIG. 2. Float 104 is connected to lever 106 which is connected to switch box 108 having a switch therein to act as a level control in a manner to be explained in detail subsequently.

Above the float assembly is compartment 56 having exhaust pipe 58 for venting to the atmosphere.

Thus, in viewing FIG. 2 it will be appreciated that the basic operation of the system is shown generally although not in complete detail. A heater is provided and a blower causes hot air to be passed over a plurality of fins or honeycombed plates which pick up wastewater through rotation of such fins and the wastewater is evaporated. Solids in such wastewater are accumulated in a bucket which can be easily removed and cleaned prior to replacing such bucket in the tank of the system of the present invention. The blower and the fins may be powered by electric motors and pumps are utilized for providing wastewater to the tank or for removal of wastewater in the tank so that the tank may be cleaned periodically as required depending upon the type of wastewater being evaporated. A float assembly actuates the intake pump when the wastewater level reaches a predetermined low level and shuts off the intake when the wastewater level has reached a desired amount. The float assembly also allows the tank to be drained periodically for cleaning and the operation of the float assembly will be explained in detail subsequently.

Figure 3:
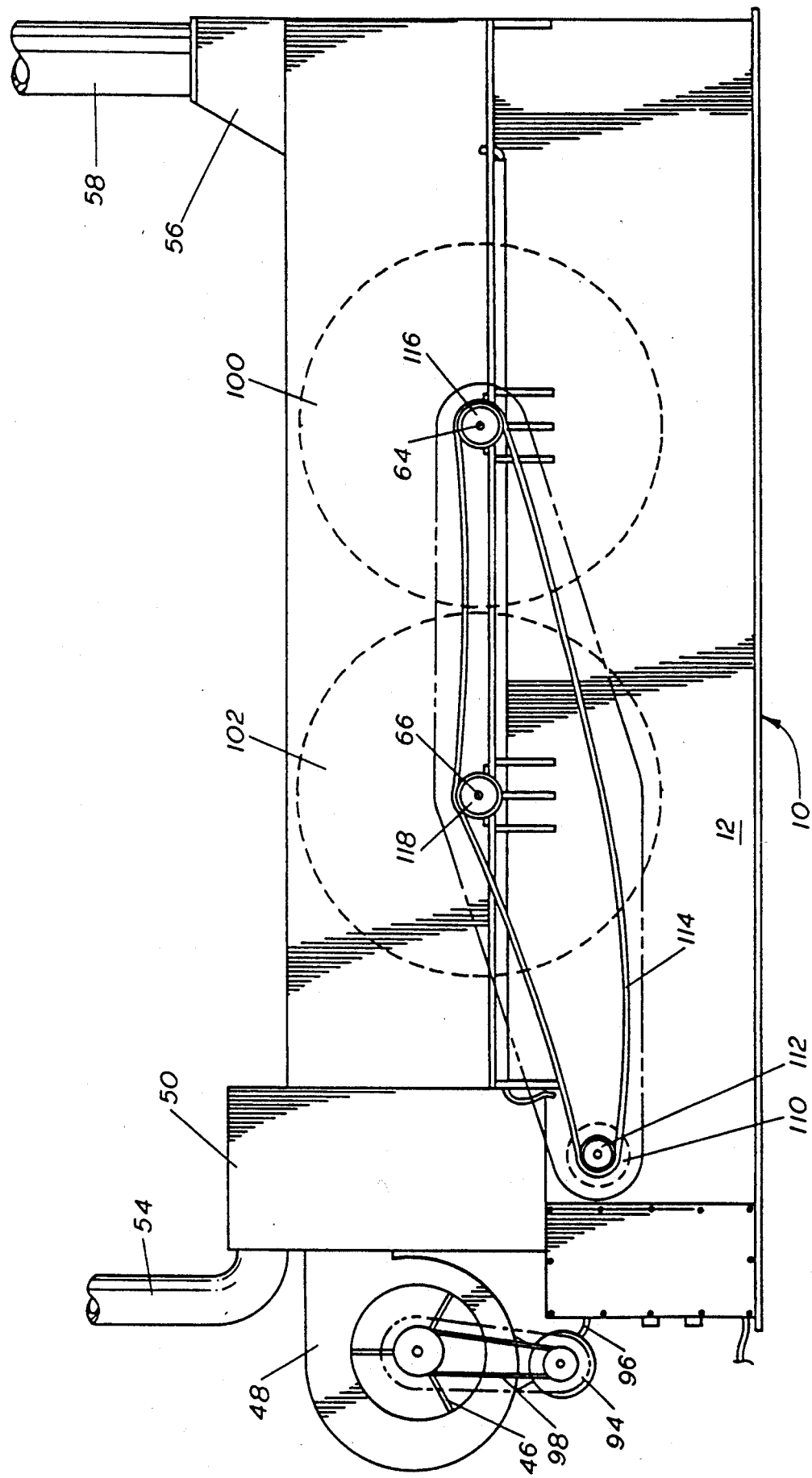
FIG. 3 is an elevational, side view of the system showing the opposite side of the view shown in FIG. 2.

FIG. 3 is an elevational, side view of the system of the present invention showing the side opposite that shown in FIG. 2. As explained previously, housing 12 rests on floor 10. In housing 12 are a plurality of fins such as fin 102 and 100 positioned respectively on axle 66 and axle 64. Electric motor 110 is part of the drive means and pulley 112 is connected to the shaft of electric motor 110 and drives chain 114. Chain 114 drives pulley 116 on axle 64 and also drives pulley 118 on axle 66. Also as explained previously the plurality of fins connected in substantially parallel relationship to axles 64 and 66 are driven by the drive means and the rotation of the fins having wastewater picked up from the bottom of the tank provides evaporation at the upper portion of housing 12 as heat from the heater in compartment 50 blows past the plurality of fins and is vented through exhaust pipe 54. Motor 94 connected to the control panel through lead 96 drives belt 98 connected to squirrel cage 46 in cover 48.

Thus in viewing FIG. 3, it will be appreciated that the drive means cause rotation of the plurality of fins to facilitate evaporation of wastewater which has been picked up by the fins when passing through the wastewater in the lower part of the tank. The combination of rotation of the fins and the turbulent hot air passing over the fins provides an improved method of wastewater evaporation not shown or suggested in any of the prior art known to applicant.

Figure 4:
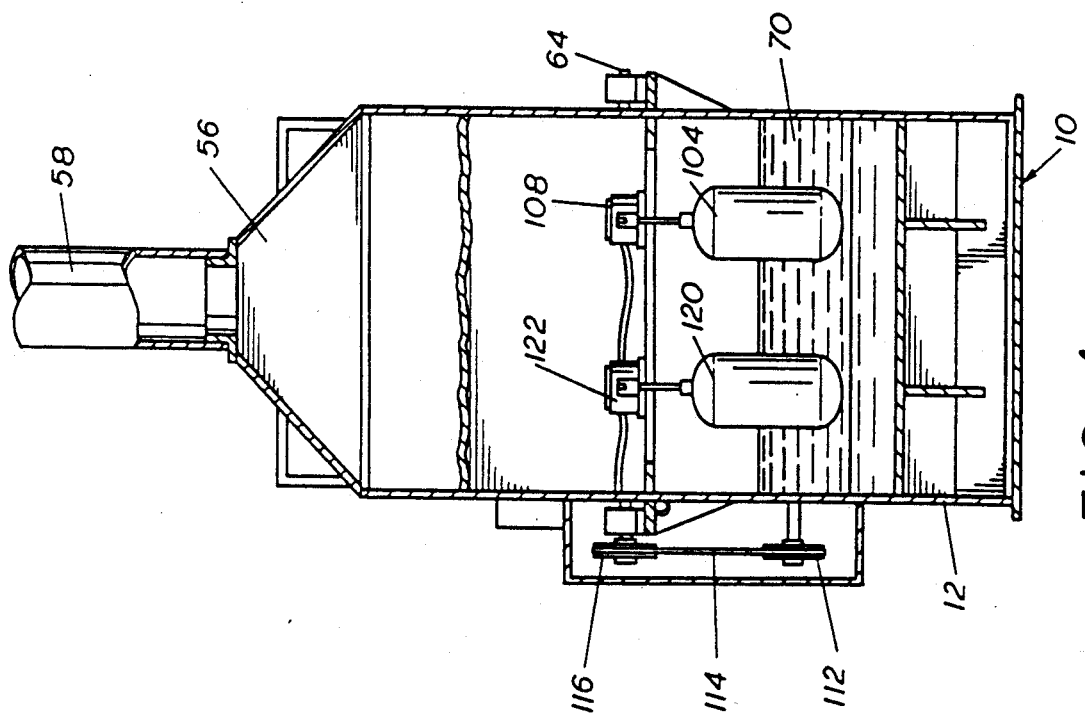
FIG. 4 is a partial sectional, end view of the system showing the float arrangement.

FIG. 4 is a partial sectional, end view of the system of the present invention showing the float arrangement. Wastewater 70 has float 104 and float 120 positioned in wastewater 70. A switch in switch box 108 is actuated by float 104 and a switch in switch box 122 is actuated by float 120. One of the switches is normally open and the other switch is normally closed. A low level of wastewater causes the pump 90 to be actuated thereby pumping wastewater into the tank for evaporation as explained previously. When the wastewater level in the tank reaches a selected amount the other float acts to turn off the entire system.

Figure 5:
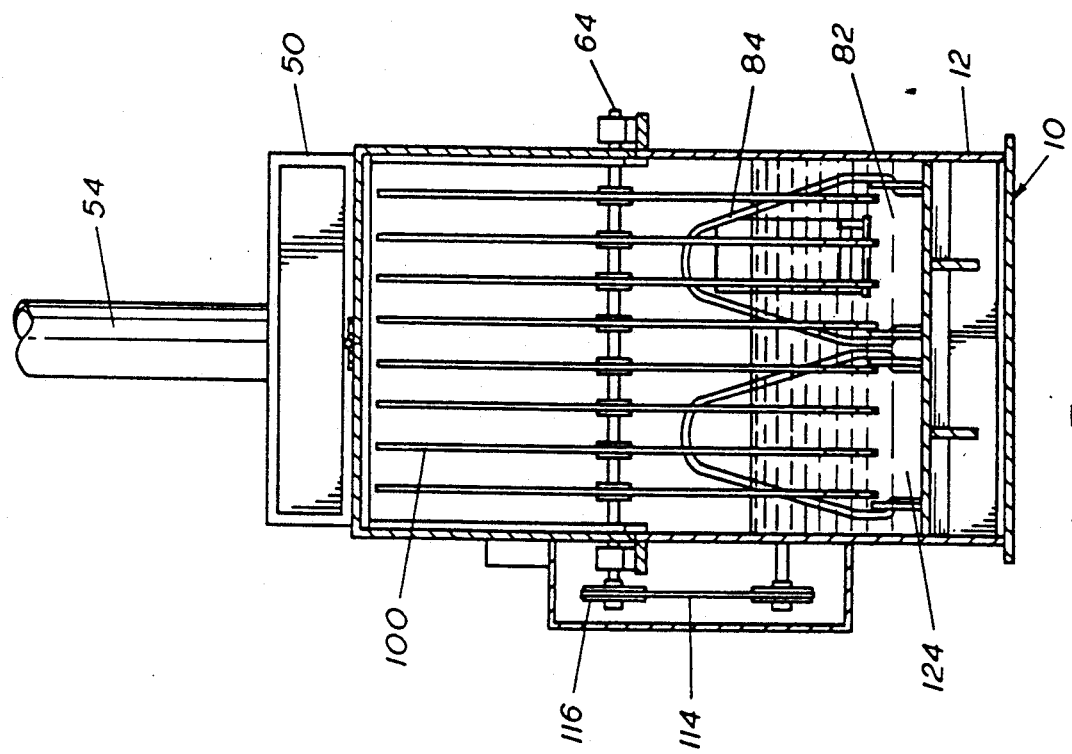
FIG. 5 is a partial sectional, end view showing the fin arrangement in the system of the present invention.

FIG. 5 is a partial sectional, end view of the system showing the position of the plurality of fins such as fin 100. Such plurality of fins are positioned on axle 64 which is driven by chain 114 on pulley 116. Bucket 82 having handle 84 is shown in FIG. 5 and a similar bucket 124 having handle 126 allows removal of solids which have accumulated in the buckets as explained previously. The system of the present invention allows accumulated solids to be easily and safely removed in comparison to comparable, related systems of evaporation.

Figure 6:
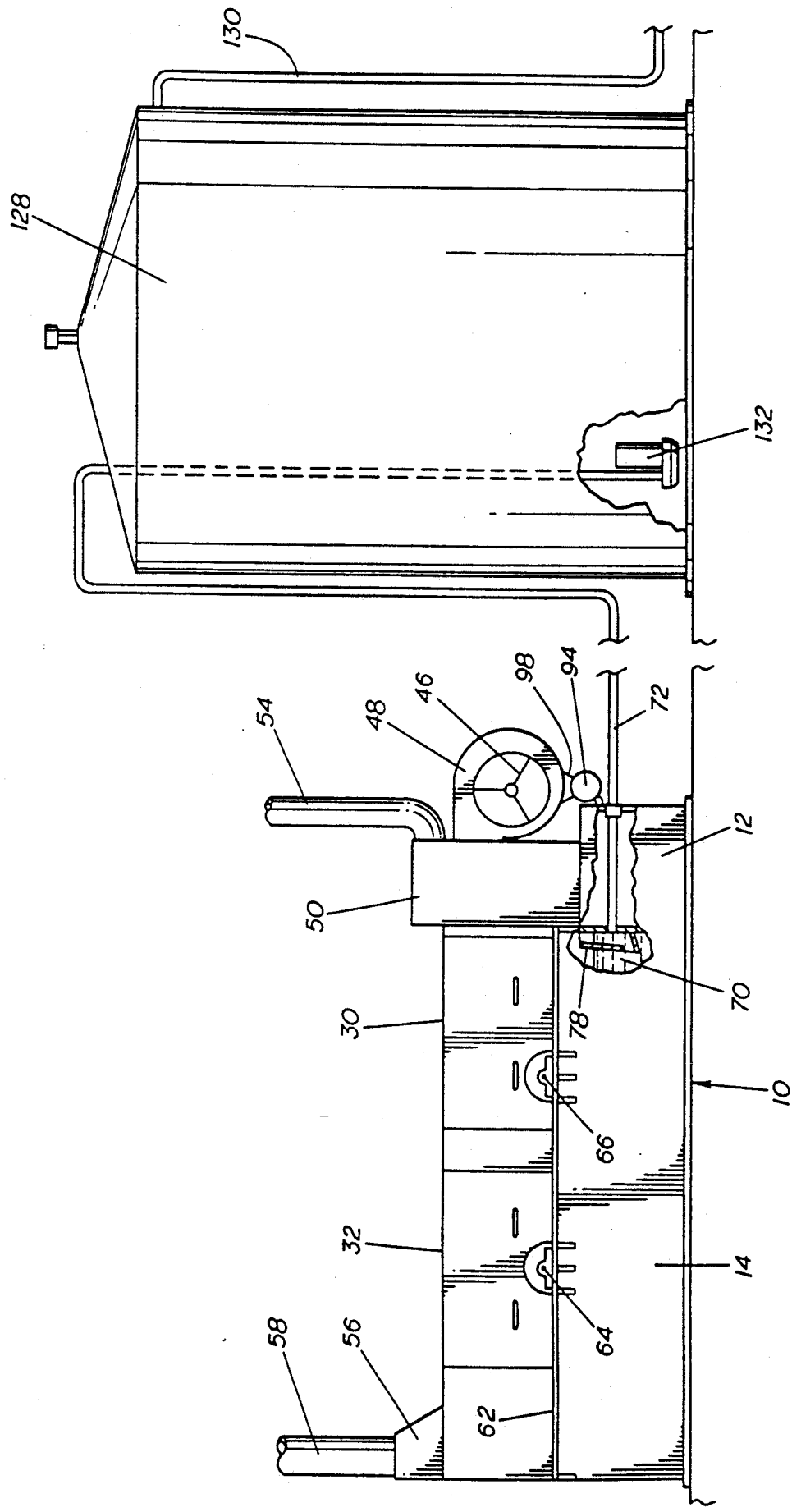
FIG. 6 is a side, elevational view of the system of the present invention connected to a tank having wastewater.

FIG. 6 is a side, elevational view of the system of the present invention showing wastewater storage tank 128 having wastewater stored therein and being provided with wastewater from a line 130 which may, for example, come from a plating process which generates wastewater. A submersible pump 132 inside tank 128 provides wastewater supply through intake 72 to the tank in housing 12 as explained previously. The intake 72 hits baffle 78 as explained previously. If desired, pump 132 may be controlled by the float arrangement.

Figure 7:
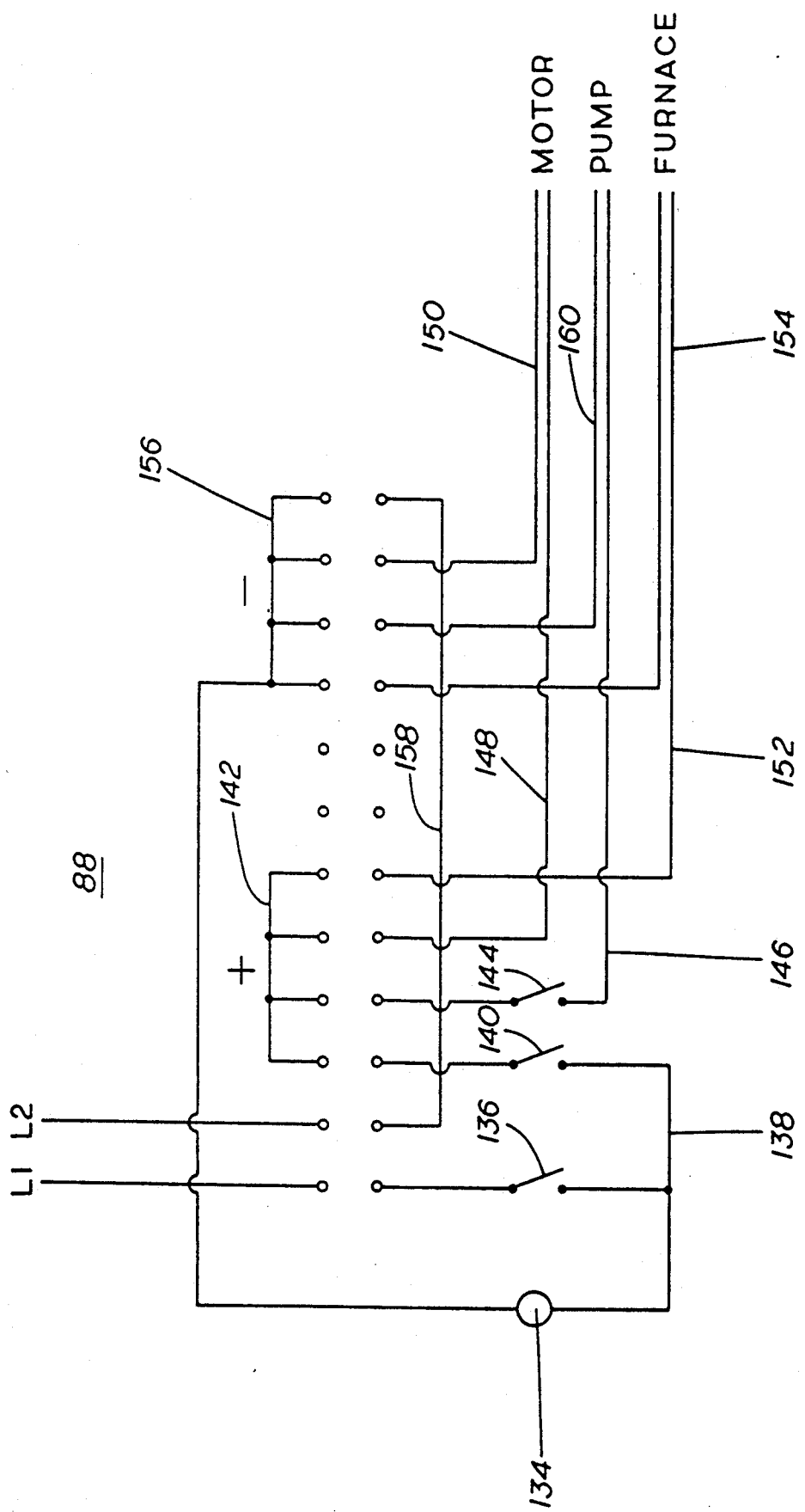
FIG. 7 is a circuit schematic diagram of the electrical control panel shown in FIG. 2.

FIG. 7 is a circuit schematic diagram of the electrical control panel shown in FIG. 2. Electrical control panel 88 has line L1 and L2 coming from an alternating current source shown as 92 in FIG. 2 and may be a conventional utility power outlet. A pilot light 134 is lit when power is turned on by switch 136. When low water switch 140 is in the closed position, line 138 is connected through water demand pump switch 144 to the positive buss 142. Water demand pump switch 144 is connected to the external pump through line 146. Line 148 and 150 are connected to the electric drive motor 110 and line 152 and 154 are connected to the motor 94 of the furnace furnace. A negative buss 156 is provided through line 158 which goes to L2 of the alternating current source.

It will be appreciated in viewing FIG. 7 that the low water switch 140 actuates the submersible pump 132 shown in FIG. 6 to cause wastewater to enter the tank thereby assuring that an adequate supply of wastewater is present in the system at all times. Also, the electric drive motor 110 is shut down when the low water switch 140 is opened. The submersible pump 132 has a negative power connection through line 160.

Thus, it will be appreciated that the present invention provides a system and a method for removing solids from wastewater and then provides rapid and economical evaporation of such wastewater through an improved combination of old elements acting to give a new, and unexpected result. The present invention is characterized by simplicity, safety, efficiency, easy maintenance, and relatively simple installation.

Although a preferred embodiment of the invention has been shown and described in accordance with the United States patent laws, it will be appreciated by those skilled in the art to which the present invention pertains that modifications and improvements may be made without departing from the spirit of the invention defined by the claims.

I claim:

1. A wastewater evaporator system comprising in combination;

housing means including an evaporator tank at atmospheric pressure, and a heater, blower means including a squirrel cage in a cover positioned on said housing means and adjacent said heater, a plurality of honeycombed plates radially positioned in said evaporator tank of said housing means, control means including drive means for providing rotational movement of said plurality of honeycombed plates in said evaporator tank, said blower means passing heated air over the rotating plurality of honeycombed plates and said control means further including a first pump, and first and second floats positioned in said evaporator tank, each of said first and second floats having a switch connected to said first pump, a source of wastewater connected to said evaporator tank, and circuit means energized by a source of alternating current electric power connected to said heater, to said blower means, and to said control means whereby said system is controlled by said first and second floats to allow wastewater to be pumped into said evaporator tank for evaporation and to shut down said system.

2. The wastewater evaporator system defined by claim 1 wherein said control means further includes a second pump connected to said evaporator tank for draining said evaporator tank.

3. The wastewater evaporator system defined by claim 1 wherein said housing means includes a sludge bucket.

4. A wastewater evaporator system comprising in combination:

housing means including first and second doors, an evaporator tank at atmospheric pressure, a baffle positioned in said evaporator tank, a sludge container positioned below said baffle, and a heater, blower means including a first motor and a squirrel cage connected to said first motor and positioned on said housing means adjacent said heater, a first and second group of plurality of honeycombed plates, each of said first and second group of plurality of honeycombed plates being positioned in substantially parallel relationship in said evaporator tank of said housing means, control means including a second motor for providing rotational movement of said plurality of honeycombed plates, said control means further including a first pump, and float means positioned in said evaporator tank and connected to said first pump, a source of wastewater connected to said evaporator tank adjacent said baffle, and circuit means energized by a source of electric power connected to said heater, to said first motor, and to said control means for intermittently providing additional wastewater to said evaporator tank as wastewater in said evaporator tank is evaporated as said plurality of honeycombed plates rotates in proximity to said blower means.

* * * * *